UNITED STATES PATENT OFFICE.

CHOKICHI MATSUOKA, OF LOS ANGELES, CALIFORNIA.

PROCESS FOR MAKING AGAR-AGAR.

1,399,359.  Specification of Letters Patent.  Patented Dec. 6, 1921.

No Drawing.  Application filed October 10, 1918.  Serial No. 257,673.

*To all whom it may concern:*

Be it known that I, CHOKICHI MATSUOKA, a subject of the Emperor of Japan, residing in the city and county of Los Angeles and State of California, have invented a Process for Making Agar-Agar, of which the following is a specification.

The present invention relates to a process of preparing agar-agar from a particular species of seaweed, the same being a porous and gelatinous substance adapted for many industrial purposes, medicinal purposes, for bacilli cultures, and as a food and ingredient of foods.

In preparing this substance, I employ the seaweed *Gloiapeltis*, freshly gathered and then dried with sun heat. After drying liquid chlorin one part to nine parts of *Gloiapeltis* is added for bleaching the same. After bleaching, the substance is treated with a ten per cent. solution of water and sodium thiosulfate, one part to nine parts of *Gloiapeltis* rendering the substance odorless. The substance is then washed one or more times in pure water, and then placed in clear water and boiled at a temperature over one hundred degrees centigrade until a viscid character is assumed, and thereafter is placed on a screen or in a porous cloth, thus filtering or draining the bulk of the viscid substance from lumpy and undissolved portions and sand and similar impurities. The drained product is more or less homogeneous and colorless and odorless.

The gelatinous substance is then subjected to a cold temperature until frozen, being preferably placed in a cold storage or refrigerating device for this operation. The substance is then taken from the cold storage and preferably placed in a cool and darkened place by any suitable heating or drying apparatus, until thoroughly dry, producing an odorless and porous substance which may be readily handled for storage, shipment, distribution, and use.

The temperature which I employ for the freezing step is preferably not higher than $-5°$ centigrade. The object of this step is to produce a physical and chemical change in the substance, making the same more valuable as a food. The preferred method of drying with sun heat preserves and retains a percentage of the desirable qualities imparted by the freezing step, whereas the subjection of the substance to the heat derived from any drying apparatus would tend to detract from these desirable food qualities.

The foregoing may be modified by adding, during or at the commencement of the boiling operation, a quantity of *Gelidium*, which produces a composition of matter having similar properties, and of practically the same character as the product of the first-named process.

The *Gelidium* is employed as a substitute for *Gloiapeltis*, and is preferably added in the proportion of equal parts of *Gelidium* and *Gloiapeltis*. The particular species of seaweed named *Gloiapeltis* is usually black or dark brown in color in its natural state, and is rare in some places and difficult to obtain, and therefore the use of *Gelidium* reduces the cost of the product.

The substance or compound effected by this process is adaptable for many uses and purposes, and as a substitute for materials of similar character. The invention consists in the successive operations as set forth, the precise element of time therefore not being deemed essential, but may depend upon the amount of material treated, and associated means for carrying on the process.

*Gloiapeltis*, owing to its appearance and character, and the difficulty of obtaining it, has heretofore been practically a waste material, and not used for any purpose. The freezing process or step I employ, gives a product of superior quality, and possessing qualities not found in animal gelatin or other like substances.

I claim.

1. The process of making agar-agar, which consists of drying *Gloiapeltis*, adding liquid chlorin thereto in the proportion of one part by weight of liquid chlorin to nine parts by weight of *Gloiapeltis*, and allowing the same to stand until bleached, treating the bleached substance with a solution of sodium thiosulfate, thereafter washing the substance one or more times in water, placing in clear water and boiling the same until the substance becomes a homogeneous and viscid mass, freezing the viscid substance, subjecting the viscid substance to a temperature not higher than $-5°$ centigrade, and finally drying the substance.

2. The process of preparing agar-agar, consisting of drying a quantity of *Gloiapeltis*, adding chlorin thereto until bleached, treating the bleached substance with a solution of sodium thiosulfate, removing the substance from the solution and washing the same in clear water, subjecting the cleansed substance to the action of heated water until a homogeneous and viscid mass is obtained, freezing the viscid mass, and finally drying the same with sun heat.

In testimony whereof, I hereunto affix my signature.

CHOKICHI MATSUOKA.